May 19, 1964     A. L. BURNETT     3,133,518
DRY DOCK LOCK

Filed Sept. 22, 1961     4 Sheets-Sheet 1

INVENTOR
A. L. BURNETT

BY *Howard W. Hermann*

AGENT

INVENTOR
A. L. BURNETT

BY Howard W. Hermann

AGENT.

May 19, 1964 A. L. BURNETT 3,133,518
DRY DOCK LOCK
Filed Sept. 22, 1961 4 Sheets-Sheet 3

INVENTOR
A. L. BURNETT
BY
AGENT.

May 19, 1964 A. L. BURNETT 3,133,518
DRY DOCK LOCK
Filed Sept. 22, 1961 4 Sheets—Sheet 4

INVENTOR
A. L. BURNETT
BY
Howard W. Hermann
AGENT.

3,133,518
DRY DOCK LOCK
Arden L. Burnett, 619 Nicholson St., Falls Church, Va.
Filed Sept. 22, 1961, Ser. No. 140,141
14 Claims. (Cl. 114—47)
(Granted under Title 35, U.S. Code (1952), sec. 266)

The invention described herein may be manufactured and used by or for the Government of the United States of America, for governmental purposes without the payment of any royalties thereon or therefor.

This application is a continuation-in-part of application Serial No. 20,504, filed April 6, 1960, for Dry Dock Lock.

The present invention relates to floating dry docks and more particularly to a method and system for modifying existing dry dock facilities to allow accommodation of vessels of deeper draft than those for which the dry dock facilities were originally designed.

Many dry docks now in existence were built for ships having a much shallower draft than many modern vessels, and as a result, the dry-docking of a deep draft vessel for repairs is a very difficult operation and, in some cases, is impossible.

Conventional floating dry docks are generally floating pontoons comprising a hollow bottom or floor with hollow vertical side walls on each side of the floor or bottom. The area between the two side walls is open, as this space or area is used for ship's dry-docking, and repair, and normally has sufficient length and width to accommodate the vessel's length and breadth. At least one end of the dry dock is open for ship ingress and egress to and from the dry dock, and in some cases both ends are open. The ship's repair area in existing floating dry docks cannot be used as a water-tight basin. The dry dock is lowered in the water by filling the pontoon floor and side wall sections with water and likewise the facility is raised by pumping the water from the pontoon floor and side walls. A ship or boat in need of repair is floated into the open area between the two side walls after the dock is submerged. The vessel is then aligned in the proper position over the ship's blocks on the floor of the dock and water is pumped out of the pontoon side walls and floor pontoon thereby causing the dock to raise and the vessel is seated on the ship's blocks in a wet slip. Pumping of water from the floor and side walls is continued until the entire open floor area of the dock is above the water level of the main body of water at which time the vessel is in the dry. Many floating dry docks now in existence were built to accommodate ships of much less dead weight and tonnage and having a shallower draft than the present day vessels, and as a result many modern vessels cannot be dry-docked in them. Since both graving and floating dry docks are very expensive to build, any practical method of increasing the useable water depth of existing facilities or increasing the lifting capacity of existing floating dry docks results in a great saving in cost.

The present invention is a system for obtaining maximum use of present drydock facilitites with a minimum of cost and time, although it may be used in designing a new dock. This is accomplished by providing means for raising the water level in the basin with respect to the level of the surrounding water. In accordance with the present invention, there is provided a watertight gate or caisson, across the entrance to the ship repair area or basin, which is designed to keep water in as well as out. Conventional floating dry docks must be provided with double caisson, or gate, seats and a caisson or gate to be seated therein, since floating dry docks as mentioned heretofore, are normally open ended. Pumps are provided for pumping water into and out of the dry-docking area and valves may be provided for gravity flow of water when it is desired to transfer water from a higher level to a lower level.

When using a floating dry dock incorporating the present invention, the dry dock is submerged to the desired low water level with the dock hovering or lightly resting on the bottom of the body of water in which the facility is being used. The vessel is brought into the dry dock directly in the location selected for dry-docking after the ship's blocking is moved out of the area that the ship's hull will occupy, or, if possible the vessel may be warped into the dry dock alongside of the blocks. The caissons are moved into the seats which prevent water from leaving the basin and water is then pumped into the ship repair area to raise the ship high enough to clear the blocks. The dry dock may be equipped with a channel design, double faced seat, or alternately may be equipped with two single faced seats in opposite hand one to the other. After the water level is raised the ship is positioned exactly in the area to be dry-docked and the keel and bilge blocks are moved under the ship or, should the ship be warped into the dry dock alongside the blocking, the ship is moved transversely into docking position. Valves are opened and the raised water level returns to the level of the body of water outside. The caissons are then moved to the seats designed to hold water out of the dry dock and the basin is pumped dry, whereupon the vessel is dry-docked.

For launching, the basin is allowed to flood to the level of water outside the dock and the dry dock hovers above or is lightly seated on the river channel bottom. The caissons are again moved to the seats which are provided for sealing water in the basin and the water level is raised to float the ship off the blocks. The keel and bilge blocks are then moved out from under the ship or alternatively the ship is moved transversely over the tops of the blocking. The water level again returns to that of the surrounding water, the caisson is removed, and the vessel is launched to open water. The entire docking operation for floating dry docks may be accomplished by self-propelling the caisson back and forth in a channel-design, double faced seat, or moving the caisson back and forth in this seat, or alternatively may be performed by moving the caisson back and forth between two single faced caisson seats in opposite hand to each other.

It will be seen that in addition to the deep draft docking facilities acquired by providing gates to close the basin of the floating dry dock, the weight lifting capacity of the dry dock is also increased. The lifting capacity of present dry docks is limited to not more than the combined weight of the water displaced in the pontoon sections of the floor and side walls and the dead weight of the structure. According to the present invention, the large area in the central portion of the facility, which is used for ship repair, will also be watertight by sealing the ends with a gate or caisson. This in effect makes the entire dry dock a hollow pontoon. The water displaced for lifting a vessel becomes equal to the entire volume of the dry dock less the weight of the dry dock itself.

Thus it is an object of the present invention to provide the facilities for dry-docking deep draft ships at a minimum of cost.

Another object is to dry dock heavier ships than existing dry docks are designed to dry dock.

A further object of the invention is the provision of a system for utilizing existing dry dock facilities for dry-docking deeper draft ships than those for which the dry dock was originally designed without sinking the dock deeper into the water than its normal submerged docking draft.

A still further object is to operate the dry dock deeper in the water than is now possible to counteract increased vessel tonnage for docking heavier ships.

Still another object is to provide a system for dry-docking deep draft vessels in a minimum of time.

Other objects and many of the attendant advantages of this invention will be readily appreciated as the same become better understood by reference to the following detailed description when considered in connection with the accompanying drawings in which like reference numerals designate like parts throughout the figures thereof and wherein.

Figure 1:
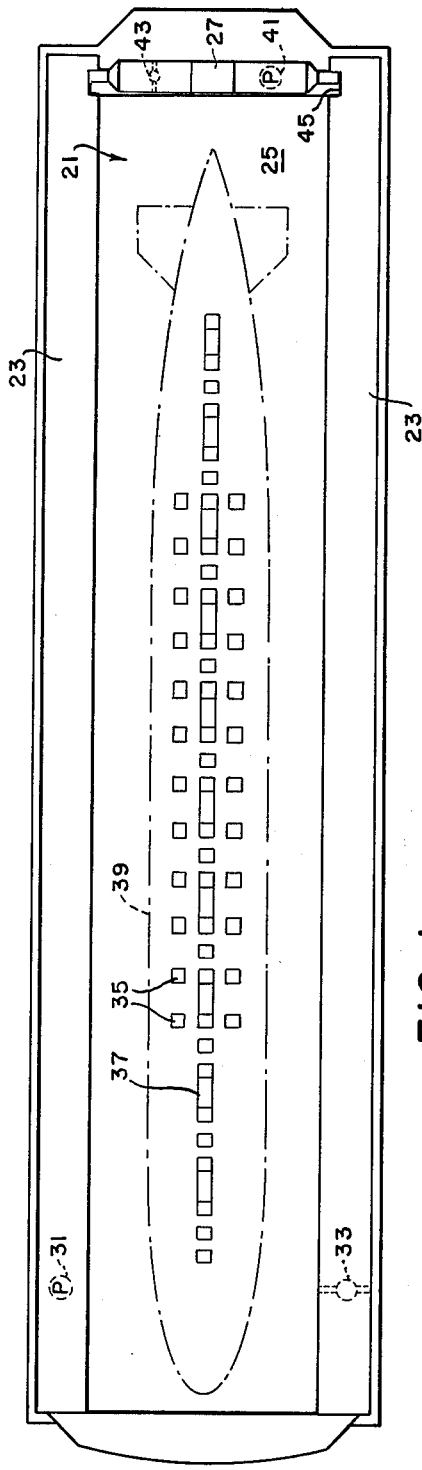
FIG. 1 is a top view of a floating dry dock of the type which has two open ends and wherein one of said ends is closed and the other end embodies the present invention.
Figure 2:
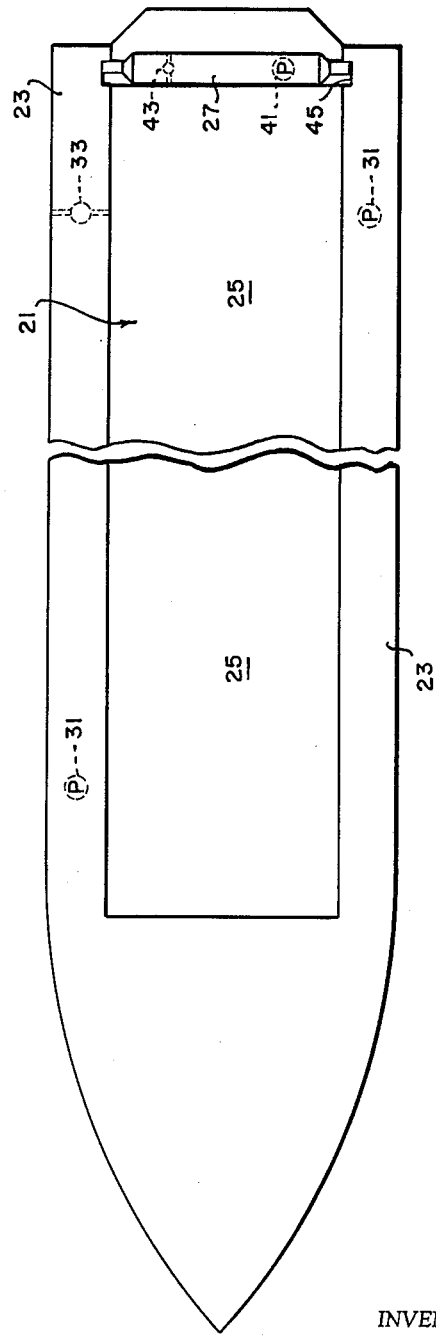
FIG. 2 is a top view of a floating dry dock having a single open end and embodying the present invention.

Referring now to the drawings, wherein like reference characters designate like or corresponding parts throughout the several views, there is shown in FIG. 1 a type of floating dry dock having two open ends and in FIG. 2 a type of floating dry dock having a single open end at the stern; the bow being pointed. In accordance with the present invention, however, the operation of the two docks are similar. In each dock there is shown a basin 21 bounded by a pair of hollow side walls 23 and a floor 25. The end of the basin, which is designed for ship ingress and egress between the basin and the ambient water, is provided with a caisson 27 which is adapted to be seated in a channel shaped, double faced caisson seat 45 formed in the walls 23 and floor 25 of the basin and is adapted to seal water in or out of the basin, as required for operation of the dock in accordance with this invention. In the case of the double ended basin as shown in FIG. 1, a similar caisson and caisson seating arrangement may be provided at both ends or, alternatively, one end may be provided with a permanent wall, thus making the dry-docking operation with the two docks illustrated in FIGS. 1 and 2 identical.

A plurality of pumps 31 and 33 are provided in the dry dock walls for pumping water out of the side walls and in or out of the basin 21 as desired. On the floor of the basin there are provided a plurality of selectively positionable bilge blocks 35 and keel blocks 37 which are utilized to support a ship hull 39 in the dry dock basin as shown in phantom lines in FIG. 1. A similar arrangement would, of course, be used in the embodiment shown in FIG. 2.

Figure 7:
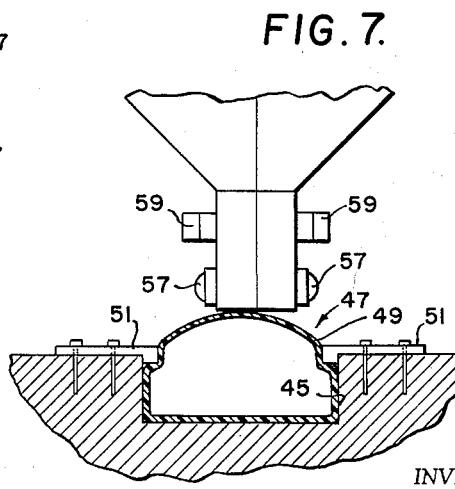
FIG. 7 is a fragmentary detailed view of the caisson seating arrangement of the caissons of FIGS. 1 and 2.

The caisson 27 is hollow and is adapted to be filled with water or drained, as desired, by operation of pumps 41 and/or by the use of valves 43 which will be described in greater detail hereinafter, and is designed to fit into a channel shaped double faced caisson seat 45 (FIGS. 3-7) to seal the open end of the dry dock basin 21. As may be seen from FIGS. 5 and 7 the caisson seat 45 is provided at its lower portions with a caisson seat guard indicated generally by numeral 47 which comprises an inflatable liner 49 which may be made of rubber, plastic, fiber, or the like; and a pair of steel plates 51 secured to the dock at either side of the seat. The liner 49 is preferably glued or cemented in place or may be held in place with slip-on lugs. As shown in FIG. 7 plates 51 each have a flanged portion which fits into caisson seat 45 on each face thereof and extends along a portion of its depth. This flanged portion, which is of relatively heavy thickness, also aids in retaining liner 49 within the seat 45.

Figure 3:
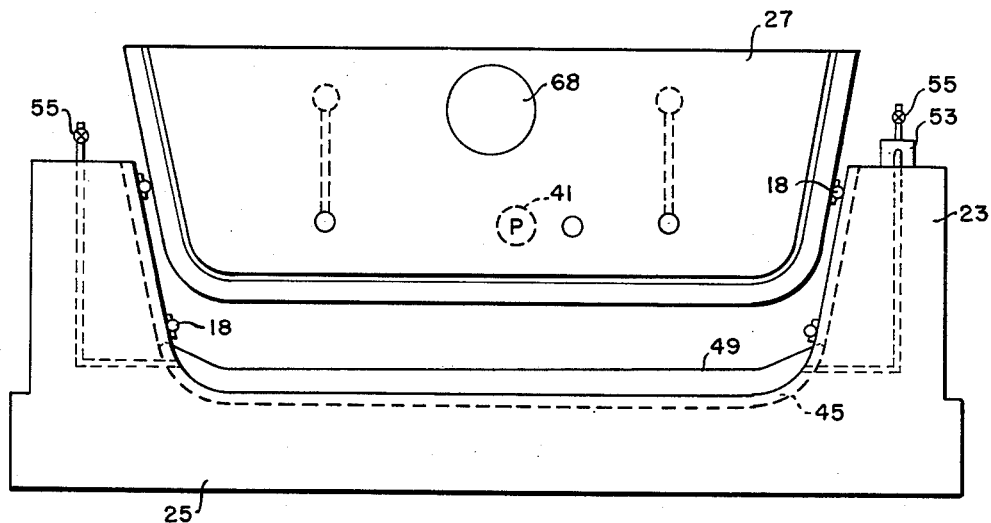
FIG. 3 is an end view of either of the embodiments shown in FIGS. 1 and 2 showing the caisson in raised position over its seat.
Figure 4:
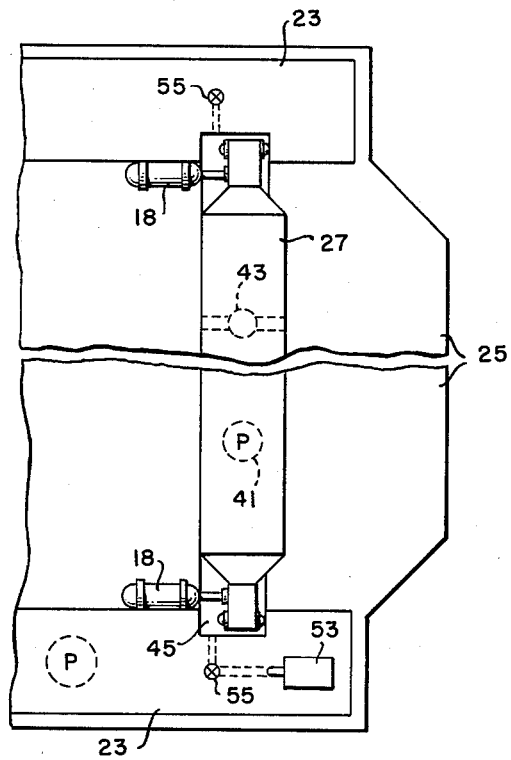
FIG. 4 is a fragmentary top view of the embodiment shown in either of FIGS. 1 and 2 showing the caisson positioned to seal water within the basin at a higher level than the ambient water.
Figure 6:
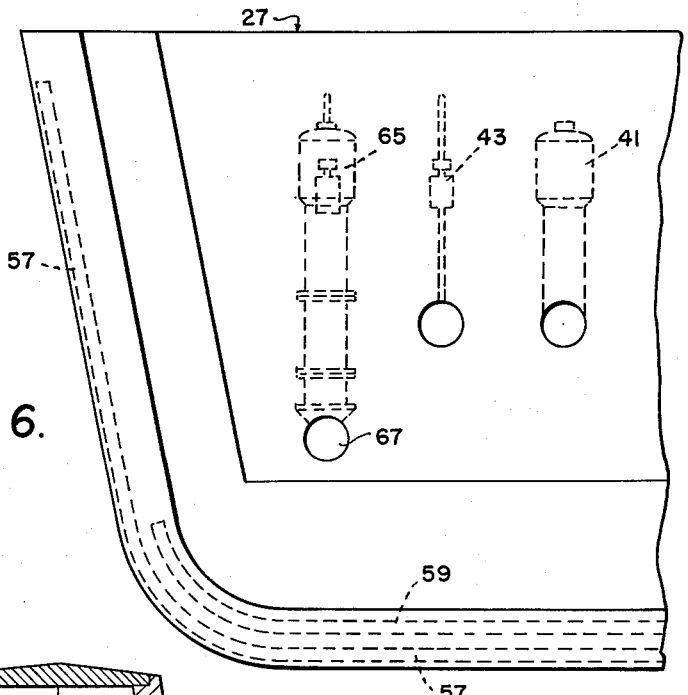
FIG. 6 is a fragmentary side view of the caisson shown in FIG. 5.

As shown in FIGS. 3 and 4, a compressor or pump 53 is provided for providing air pressure to inflate liner 49, and a pair of pressure relief valves 55 are provided for deflation as will be described hereinafter.

The caisson 27, as stated above, is designed to be seated in caisson seat 45 to seal water either in or out of basin 25, as desired. For this purpose there is provided a compressible sealing strip 57 of rubber or the like on each side of the caisson. The sealing strip 57 and the inflatable liner 49 aid in preventing leakage of water into or out of the dock basin when the caisson 27 is seated in caisson seat 45. To aid in preventing logs and debris from falling into the caisson seat, there is also provided a log guard 59 at each side of the caisson 27. The log guard substantially covers the caisson seat opening when the caisson is seated and thereby acts to keep large pieces of debris from clogging the caisson seat or damaging the inflatable liner 49. Caisson ballast pumps 41, flow valves 43, and basin pumps 65 are mounted in the caisson for controlling the basin water level and buoyancy of the caisson as will be described hereinafter. Also provided in the caisson 27, at the top thereof, is a removable section 68 which is designed to be removed, if necessary, in order to facilitate removal of the dry-docked ship's propeller shaft.

The dry-docking operation utilizing the present invention is initiated by pumping water from the caisson in order to raise it from its seat and allow it to be floated out of the way. The dry dock is sunk to the desired level by allowing the walls and floor to fill with water. If the vessel to be docked is of a shallow draft and of small enough tonnage to be handled by the existing dock, the vessel is then warped into position over bilge blocks 35 and keel blocks 37 and the water is pumped out of the sidewalls 23 and floor 25 allowing the dry dock to rise seating the vessel and raising it above the level of the surrounding water. In this manner, the dry dock is used as a conventional floating dry dock.

Figure 5:
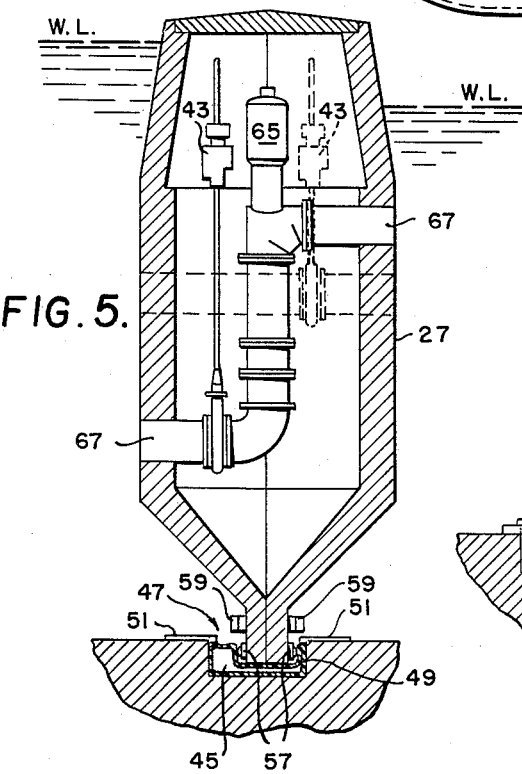
FIG. 5 is a transverse sectional view through a seated caisson showing a typical pump installation for the caissons of the embodiments shown in FIGS. 1 and 2.
Figure 8:
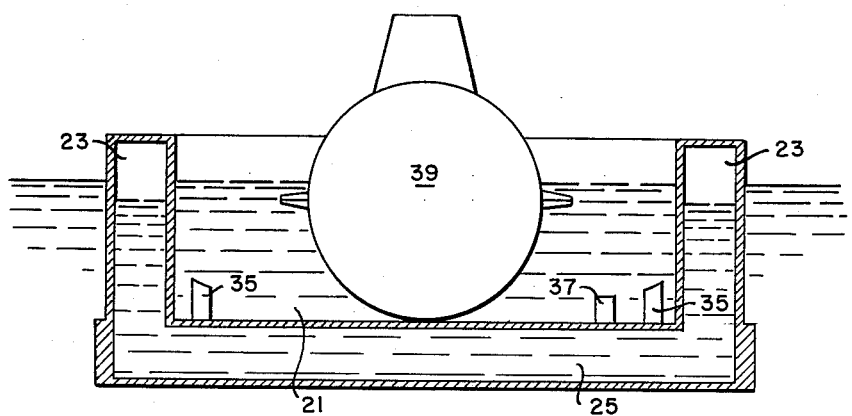
FIG. 8 is a partly diagrammatic sectional view of the dry dock illustrated in FIGS. 1 and 2 showing a submarine entering the dry dock; as a first step of the dry-docking operation.
Figure 9:
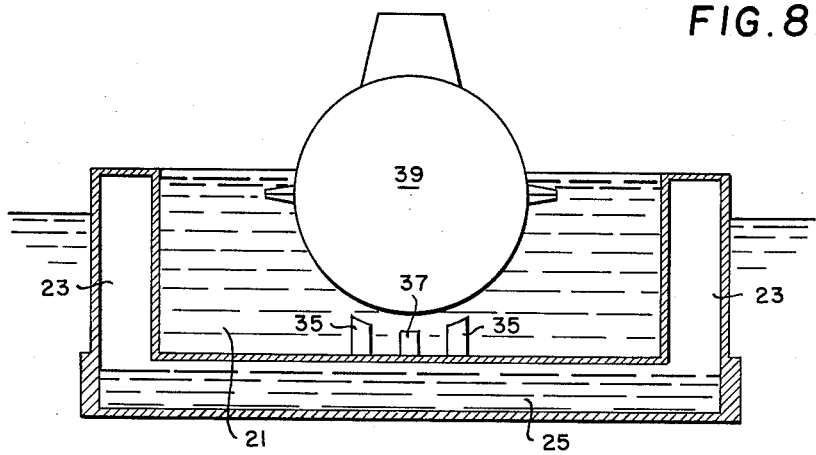
FIG. 9 is a sectional view similar to FIG. 8 showing the water level in the dry dock raised in accordance with the present invention and the bilge and keel blocks in position under the hull.

If the ship to be docked has a draft which will not allow it to clear the blocks, as shown in FIG. 8, or if the lifting capacity of the dock is not adequate for raising the ship above the level of the surrounding water, an alternate procedure must be used. Bilge blocks 35 and keel blocks 37 are moved to a location which will allow the ship to be warped into the basin either alongside or between the blocks. Water fills the voids in the floor 25 and sidewalls 23 and the dock subsides in the water to a level sufficiently low for the ship to enter the basin alongside the blocks. Ship 39 is then warped into the basin 21 and the caisson 27 is moved over the caisson seat 45. The inflatable liner 49 is initially inflated by use of compressor 53 in order to prevent mud and debris from falling into the caisson seat 45. The caisson 27 is then sunk to a point where it floats about one inch above the bottom of the caisson seat 45. Sinking is accomplished by opening the valves associated with the caisson ballast pump system 41, allowing the caisson to flood with water, and as the caisson settles upon the inflatable liner 49 the weight of the caisson is sufficient to cause the air in the liner 49 to be forced out through use of check valves 55. At this point, the basin pumps 65 which are mounted in the caisson are activated to pump water into the basin. The water pumped through the discharge pipe 67 into the basin forms a water jet which self-propels the caisson 27 to the outboard face of the channel shaped, double faced seat 45, thus semi-sealing the caissons against water spill out around the perimeter of the caisson at the start of pumping operations. Alternatively, hydraulic rams 18 may be used to semi-seal the caisson against water spill out at the start of pumping operations. Pumping is continued, using the pumps 65, and the water level within the basin rises; additional water is pumped into the caisson at the same time using the caisson ballast pumps 41 as required. Thus, as the water level in the basin 21 rises, the caisson sinks deeper into the caisson seat 45. The greater water pressure from within the basin compresses the sealing strips 57 around the perimeter of the caisson thus forming a water tight seal between the caisson and caisson seat. Pumps 33 in the sidewall of the dry dock are also activated at the time pumping operations begin to raise the water level in the basin and at the same time water is pumped out of the sidewalls 23 by use of pumps 31 in order to prevent the dry dock from sinking lower into the water. The transfer, in effect, of water from the dry dock sidewalls and floor to the basin increases the water depth within the basin and also acts to prevent the dry dock from sinking deeper. During this period the water level in the basin is maintained at a slightly higher level than the external water in order to hold the caisson in place in its seat as illustrated in FIG. 5. Pumping is continued until the water in the basin 21 rises to a height sufficient to float the ship 39 slightly higher than the tops of the keel block 37 and bilge blocks 35 as shown in FIG. 9. When the desired water level is reached, pumping is discontinued and valve 43 on the discharge line 67 is closed to seal the water at the desired water level.

Figure 10:
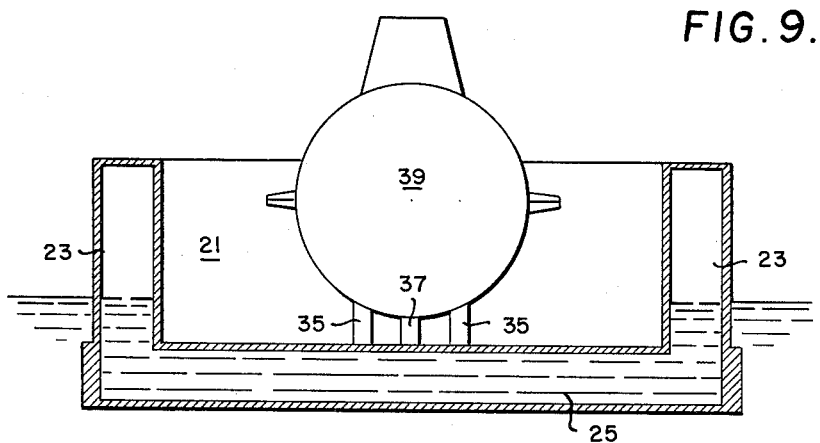
FIG. 10 is a sectional view similar to FIGS. 8 and 9 showing the position of the submarine in the dry basin after the docking operation is completed.

Ship 39 is then moved to the exact docking position and the keel and bilge blocks 37, 35 are moved under the ship or alternatively the ship is moved transversely over the ship's blocks, as shown in FIG. 9. Valves 43 are then opened in the caisson allowing the water to drain from the basin to a level substantially equal to the level outside of the basin. When the water level in the basin has subsided to that external to the dry dock, ballast pumps 41 are activated in order to pump water out of the caisson until it floats again about one inch above the caisson seat 45. Pumps 65 are then started to pump water out of the basin into the surrounding water and the caisson is moved to the inboard side of the channel shaped caisson seat 45, and water is again pumped back into the dry dock side walls 23 and floor 25. As the water level in the basin 21 lowers, pumps 41 increase the amount of ballast water in the caisson causing the caisson to sink deeper into the seat. The greater water pressure on the outboard side of the caisson now compresses the sealing strips 57 thus forming a water tight seal between the caisson and the caisson seat. De-watering of the basin 21 is continued until the ship is dry docked and filling the voids in the sidewalls and floor is continued so that the dry dock floor is lower than the water level external to the dry dock basin at the completion of the docking operation. The floating dock thus resembles a graving dock in appearance as the floor or work area for ship repair is positioned at a lower level than the level of water in the main body of water. This can be seen in FIG. 10 wherein a ship 39 is positioned in a dry basin which is lower than the external water level. The caisson 27, because of the water pressure against the external side, is held in its proper position and a water tight seal is maintained between the caisson and caisson seat.

When the ship is ready for undocking the valves 43 are opened allowing the basin to flood to the level of water external to the dry dock. As water flows into the basin 21, the dry dock begins to sink deeper into the water. The rate of subsidence is controlled by activating pumps 33 and thereby emptying water from the dry dock side walls and floors. Pumping water from the side walls and floor, and the flooding of basin 21 is continued until the dry dock basin is again submerged to its deepest allowable limit. The caisson is then moved to the outboard side of the seat and pumps again are used to pump the water into the basin 21. Pump 33 also activated at the same time and water is pumped out of the voids in the portion sidewalls and floor. Again there is, in effect, the transfer of water from the sidewalls and floor to the ship's basin with only a slight change in the level of the dry dock in the water. The water within the basin is maintained at a level above the level of the water external to the basin's so that the caisson remains seated. When the desired water level is reached in the basin the blocks are moved out from under the ship or, alternatively, if the basin is sufficiently wide the ship is moved transversely across the top of the blocks. The valves 43 are again opened and the water level in the basin subsides to the water external to the dry dock. Caisson 27 is then removed and moved out of the way and the ship is again launched to open water.

The invention as described allows dry-docking of deep draft vessels in floating dry docks which were designed for vessels having a much shallower draft without sinking the dock deeper into the water. The invention also allows existing docks to lift heavier ships than they were designed to lift. Thus existing facilities can be altered to accommodate deep draft vessels of additional vessel tonnage at a minimum of expense. In addition, the present invention includes means for preventing mud and debris from clogging the caisson seat and means are provided in the caisson for allowing a portion of the caisson to be removed in order to facilitate removal of the ship's propeller shaft in case a very long ship is put into the dry dock for repair.

It will be realized that many modifications of the patent invention are possible. The placement of the caisson seats may be varied. A swing-out or swing-in gate could conceivably be used instead of a floating caisson. The shape of the docks as shown in the drawings are merely for illustrative purposes and may have any desired configuration. The pumps have been shown diagrammatically and it will be realized that they may be installed in the caisson or gate and/or in the dry dock side walls with intake and discharge lines positioned as required. Obviously many other modifications and variations of the present invention are possible in light of the above teachings. It is therefore to be understood that within the scope of the appended claims the invention may be practiced otherwise than as specifically described.

What is claimed is:

1. A method for dry-docking a ship in a floating dry dock comprising the steps of moving the support blocks on the bottom of the dock basin to either side of the area of the basin over which the ship is to be placed, flooding the side walls of the dry dock until the basin of the dry dock is sunk sufficiently below the level of the surrounding water for the ship's bottom to clear the bottom of the dock basin, warping the ship into the dock basin alongside the blocks, sealing the water in the basin, raising the water level within the basin to a point sufficiently high to allow the ship's bottom to clear the tops of the blocks while simultaneously pumping water from the side walls and floor whereby the dry dock remains substantially at the same level relative to the surrounding water, moving the blocks into position under the ship, returning the water level in the basin to that of the water external to the dock, sealing the basin against water external to the basin, and pumping water from the basin whereby the ship rests on the blocks.

2. A method for utilizing existing floating dry docks for dry-docking deeper draft ships or ships of heavier tonnage than those for which the dry dock was originally built comprising moving the blocks on the bottom of the dock basin to a position whereby sufficient room is provided for the ship to be warped into basin alongside the block, sinking the dry dock to its deepest allowable position, moving said ship into said basin alongside the blocks, moving a caisson into a caisson seat designed to seal water inside the basin, sinking the caisson to seal water in the basin and raising the basin water level slightly above the water level external to the dry dock by pumping water out of the dry dock floor and side walls while water is pumped into the basin, pumping water from the side walls and floor of the basin while simultaneously raising the water level within the basin until the water level within the basin is sufficiently high to allow the ship's bottom to clear the blocks, moving the blocks under water into position under the ship's hull, draining water from the basin until the water level within the basin is the same as that external thereto, moving the caisson to a caisson seat designed to seal water out of the basin, and de-watering the basin while flooding the dry dock side walls and floor.

3. A method for dry-docking a ship in a floating dry dock comprising the steps of moving the support blocks on the bottom of the dock basin to one side of the basin, sinking the dry dock sufficiently deep to allow the bottom of the ship to clear the floor of the dock basin by flooding the side walls and floor of the dry dock with water, warping the ship into the dock basin alongside the block, sealing the water in the basin, raising the water level in the basin sufficiently high to allow the ship's bottom to clear the tops of the blocks while simultaneously pumping water from the side walls and floor, moving the ship laterally into position over the blocks, returning the water level in the basin to that of the water external to the dock, and pumping the basin dry while simultaneously pumping water into the side walls and floor.

4. A method for dry-docking a ship in a floating dry dock comprising the steps of prepositioning the bilge blocks for one side of the ship on the bottom of the dock basin, moving the bilge blocks for the other side and the keel blocks away from the area which the ship's hull will occupy when it is in the dry dock, whereby sufficient room is provided for the ship to enter the basin between the blocks; sinking the dry dock sufficiently to allow the ship to enter the basin without touching the floor thereof, warping the ship into the basin between the blocks, raising the water level within the basin while simultaneously pumping water from the side walls until the ship is raised sufficiently to clear the tops of the blocks, moving the ship laterally until it is positioned over the prepositioned bilge blocks for said one side, moving the keel blocks and the bilge blocks for said other side into position under the ship, and draining the water from the dock basin whereby the ship rests on the blocks.

5. A method of dry-docking a ship as defined in claim 4 and further comprising the step of flooding the side walls while the basin is being drained.

6. A floating dry dock comprising a hollow floor and a pair of hollow side walls extending upwardly from said floor thereby forming a basin having at least one open end; a plurality of selectively positionable keel and bilge blocks on the floor of said basin, means for transferring water into and out of said side walls to control the buoyancy thereof, means for sealing said basin, and means for pumping water into and out of said basin to control the water level therein, said means for sealing said basin including a channel shaped caisson seat in the side walls and floor at said open end of said basin, a caisson adapted to fit into said caisson seat, and said caisson seat being provided with a guard to prevent debris from entering the seat.

7. A floating dry dock as defined in claim 6 wherein said debris guard comprises an inflatable liner, means for inflating said liner, and valve means for allowing fluid to escape from said liner.

8. A floating dry dock as defined in claim 7 wherein said debris guard further include a pair of metal plates fixedly attached to said dry dock floor and each having a lip portion extending into said caisson seat.

9. A floating dry dock as defined in claim 8 wherein said caisson includes a section at the top thereof which is made removable in order to facilitate removal of a propeller shaft from a ship positioned in the dock basin.

10. A floating dry dock as defined in claim 8 wherein pumps are provided in said caisson for pumping water out of the caisson and for pumping water into or out of said basin.

11. A floating dry dock as defined in claim 10 wherein discharge pipes and associated valve means are provided in said caisson for allowing water to flow through said caisson to equalize water levels at the opposite sides thereof when said caisson is positioned to seal said basin.

12. A dry dock caisson seat for a ship dry dock having a floor and side walls, said seat comprising a channel shaped slot in said side walls and floor and a guard to prevent debris from falling into the portion of the slot extending along said floor.

13. The invention as defined in claim 12 wherein said guard comprises an inflatable liner in said slot, means for inflating said liner, and valve means for allowing said liner to deflate upon application of predetermined pressure thereto.

14. The invention as defined in claim 13 wherein said guard further includes a pair of protective plates affixed to the floor of said dry dock along the length of the floor portion of said slot and each of said pair of plates has a lip portion extending into said slot.

References Cited in the file of this patent

UNITED STATES PATENTS

| | | |
|---|---|---|
| 843,355 | Overton | Feb. 5, 1907 |
| 998,970 | Laurenti | July 25, 1911 |
| 2,311,666 | Kalix | Feb. 23, 1943 |
| 2,314,200 | Drake | Mar. 16, 1943 |
| 2,637,171 | Black | May 5, 1953 |
| 2,889,684 | Abrahams | June 9, 1959 |

FOREIGN PATENTS

| | | |
|---|---|---|
| 3,630 | Great Britain | 1910 |
| 557,505 | Great Britain | Nov. 23, 1943 |
| 29,365 | Norway | Jan. 20, 1919 |

OTHER REFERENCES

Jane's Fighting Ships, 1960–61, p. 373.